Figure 1:
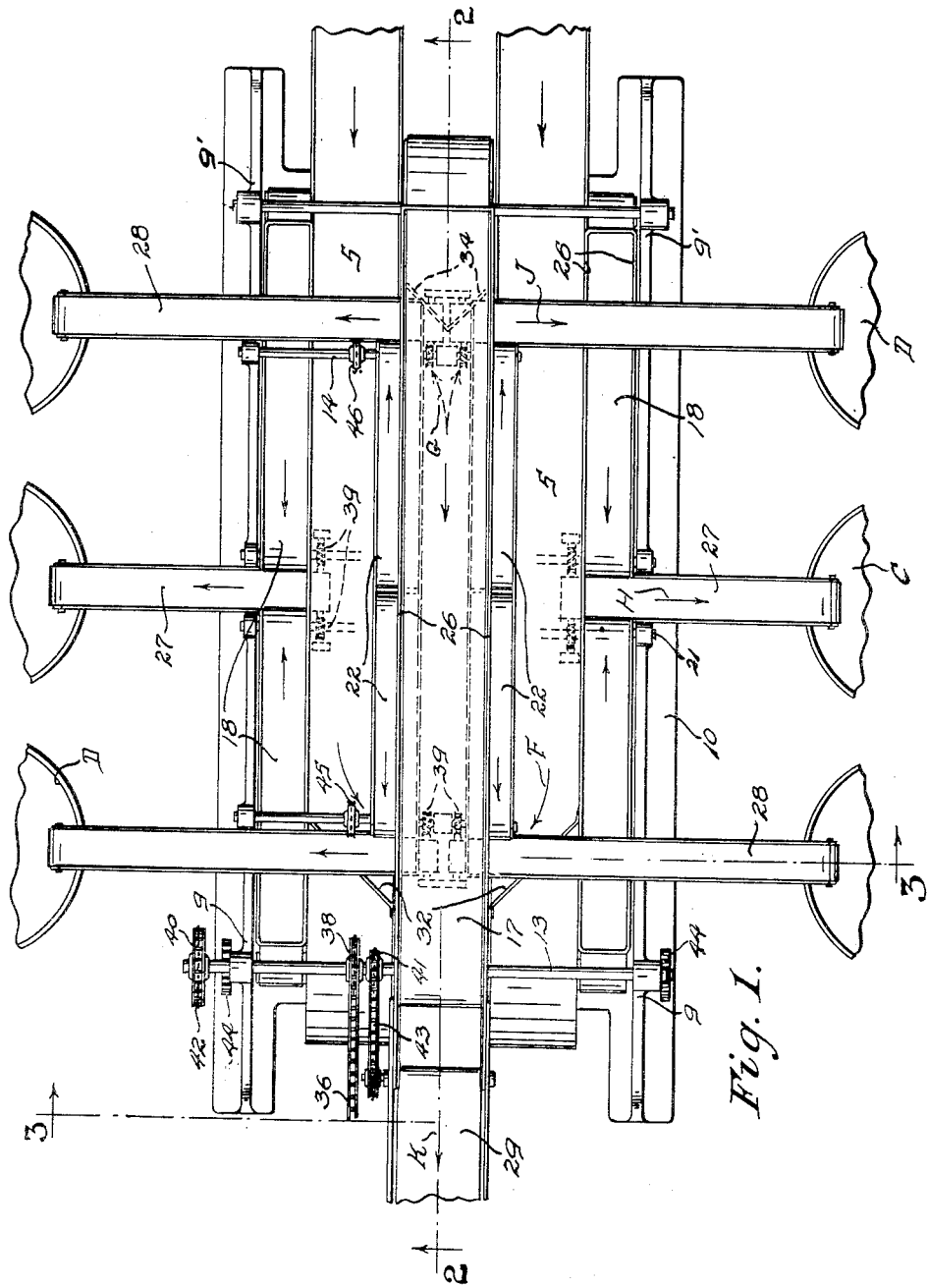

Sept. 26, 1933.   R. MORRIS   1,928,185
FRUIT SORTING APPARATUS
Filed Nov. 13, 1929   3 Sheets-Sheet 2

INVENTOR
Ross Morris
BY
Edward E. Barnes
ATTORNEY

Sept. 26, 1933.  R. MORRIS  1,928,185
FRUIT SORTING APPARATUS
Filed Nov. 13, 1929  3 Sheets-Sheet 3

INVENTOR
Ross Morris
BY
ATTORNEY

Patented Sept. 26, 1933

1,928,185

UNITED STATES PATENT OFFICE 1,928,185

FRUIT SORTING APPARATUS

Ross Morris, Zillah, Wash., assignor to Food Machinery Corporation, San Jose, Calif.

Application November 13, 1929
Serial No. 406,819

11 Claims. (Cl. 209—125)

This invention relates to improved fruit sorting apparatus, and has for an object the provision in apparatus of this character of novel belting mechanism whereby fruit may be more conveniently and economically sorted by an operator than has heretofore been possible.

A more specific object of the invention is the provision of a plurality of continuously moving table formations comprising endless belts so arranged as to be within the reach of an operator, with novel accommodations contained therewith whereby a continuously moving supply of various grades of fruit are passed within ready access to said operator.

Further objects and advantages of the invention will become apparent in the following description and claims annexed thereto, the invention consisting in feed belts and appropriate bins, together with the adaptation of drive mechanism therefor, and comprises the novel construction, adaptation and combination of the several parts as arranged.

In the drawings,—

Figure 2:
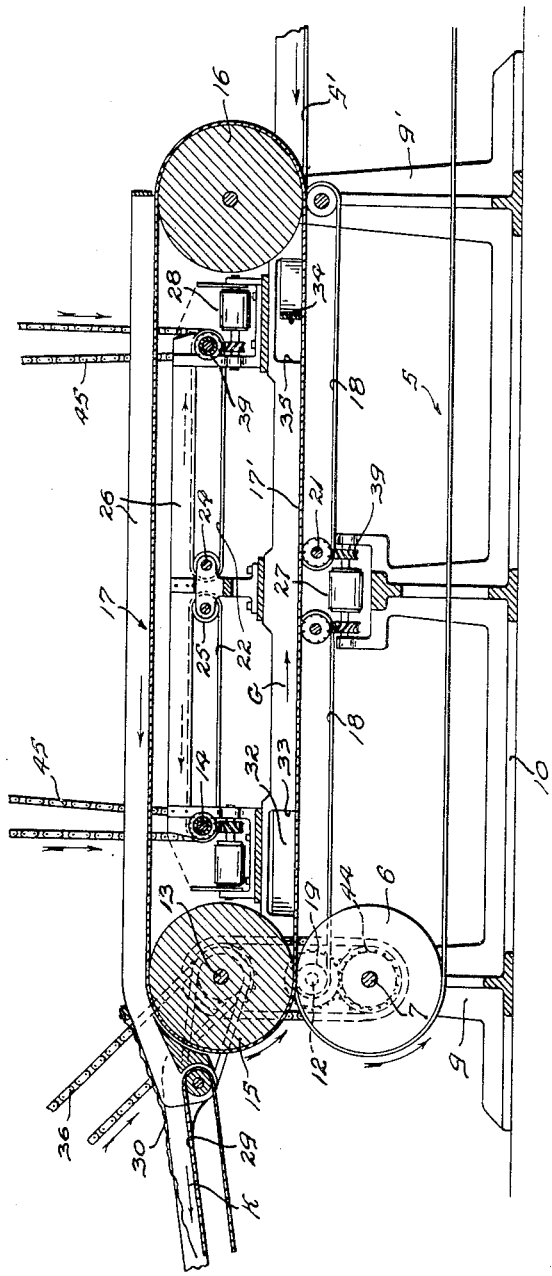
Figure 3:
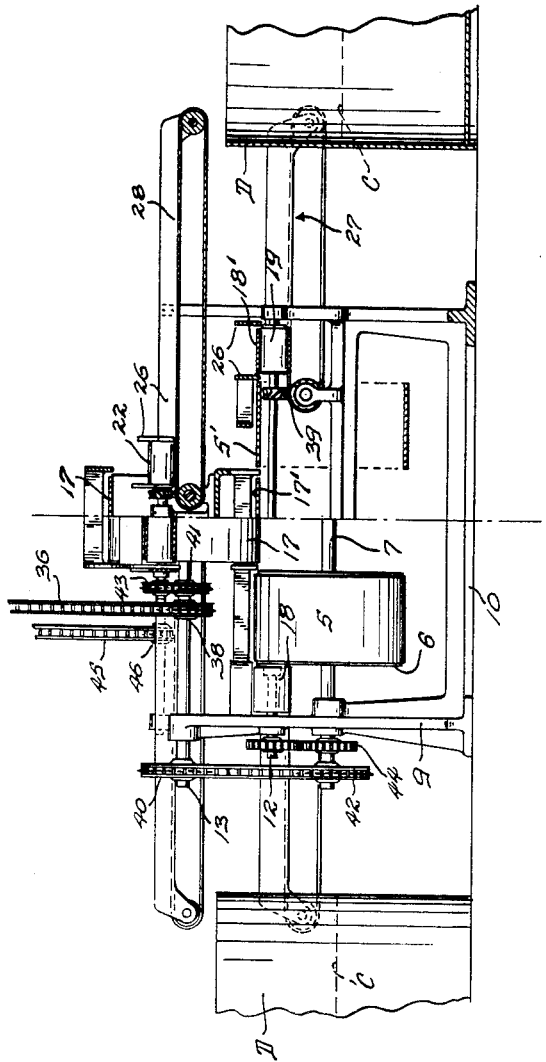

Figure 1 is a top plan view of apparatus embodying the present invention, parts being broken away, and the chute drive mechanism being indicated in broken lines. Fig. 2 is a longitudinal vertical section thereof, taken through line 2—2 of Fig. 1; and Fig. 3 is a vertical transverse section of the apparatus, substantially on broken line 3—3 of Fig. 1.

Fruit, as ordinarily sorted is generally classified as by A, B and C, according to grade. The general practice heretofore, in manual sorting, has been to mount an endless feed belt to pass in front of a plurality of operators, stationed longitudinally of the belt length at spaced intervals, with appropriate bins in close proximity to each.

A continuously moving supply of fruit traverses the length of the belt and as the stream passes, each operator selects what he considers to be the proper size adaptable for each respective bin. Such structure entails the use of considerable floor space and approximately ten to twenty operators throughout the length of the feed belt.

The present invention is primarily adapted to confine such operations to a relatively small aerial floor space, and as a result thereof, eliminating the necessity of a large sorting crew.

With the foregoing in mind, the invention contemplates mounting a belt structure wherein one or two operators are located at each side thereof, such structure adaptably providing fruit feeding belts relatively close, and allowing for the disposition of bins at relative distances therefrom. The operator selects the fruit from such adjacently disposed feed and deposits the same on selective sorter belts which transport the fruit through chute mechanism, to the bins.

Reference being taken to the drawings, my improved belt sorting apparatus comprises a pair of feed belts 5, upon which miscellaneous grades of fruit are deposited from appropriate troughs (not shown). 6 illustrates live rollers for driving said belts, said rollers being mounted in spaced transverse disposition of a driving shaft 7, which is shown as being mounted in journal bearings of the oppositely disposed upright standards 9 of a frame 10.

Said frame standards further provide journal supports for shafts 12 and 13, disposed in spaced vertical disposition, one above the other, to the shaft 7.

The shaft 13 provides rotative activity for a live roller 15, about which and an idler roller 16, journaled in standards $9^1$ of the frame, an endless sorter belt 17 is mounted, and as illustrated, is adaptably located to have the face of the return surface $17^1$ thereof in a plane with the progressive feed surface $5^1$ of the belts 5.

Laterally disposed with respect to said feed belts, I provide sectional sorter belts 18, passed about live rollers 19 and idler rollers 20, of respective shafts 12 and 21, in a manner to have the progressive portions $18^1$ thereof, desirably on a plane with the surface $5^1$ of said belts 5.

I provide, in further provision for adaptably sorting appropriate grades of fruits, pairs of laterally disposed sectional belts 22, passed about live rollers 23 and idler rollers 25, such being shown as supported by suitable shafts 14 and 24, to locate said belts desirably in offset spaced position below the progressive face portion of belt 17 and in a manner to project said belts 22 a short distance beyond the lateral edges of said belt 17.

The aforedescribed structure represents broadly, my feed and sorting arrangement, for which I have desirably provided, laterally disposed to each, wall elements 26, preferably of rigid structure, although leather or fabrical composition might be utilized.

Substantially on horizontal plane with the axis of rotation of respective sorter belt rollers, and at the delivery end thereof, I provide belt chutes 27, 28, and 29, said chutes 27 and 28 progressing in substantially right angular relation to the feed assembly outwardly to deposit in appropriate rotary bins C and D, a preferred type of such bin being illustrated and described in Patent No. 1,656,444, issued to me January 17, 1928.

The chute 29, having a vertical drop in proportion to the respective allocation of the delivery end of the sorter belt and the discharge to a suitable rotary bin, I provide with a drape 30, in a manner to retard or check a rapid fall of the fruit thereon.

The substantial bins and chutes shown are illustrative only, it being considered obvious that any or all belt chutes might be pivotally suspended with respective drapes for each in accommodating a declination of the same to such desired type of bin as might be used.

My structure further utilizes, directively allocated to the respective end portions of feed belts 5, converging flaps 32, which propel excess fruit travelling in the direction of arrow F, through the aperture 33, to and upon the return run $17^1$ of belt 17 and thence in the direction indicated by arrows G, Figs. 1 and 2, to strike diverging flaps 34, to propel outwardly through aperture 35, the fruit into engagement to the progressive feed portion $5^1$ of belt 5, in a manner to provide continuous substantially reciprocatory action of fruit which is not graded in its passage before the operators.

Such structure is of known use, and except as taken with the arrangement of sorter belts described, is not novel.

In power actuating the aforementioned live rollers 6, 15, and 19, I provide a driving chain 36 engaging the teeth of a sprocket wheel 38 mounted on said shaft 13, which in turn is further provided with sprocket wheels 40, 41, chains therefrom engaging, respectively, sprocket wheels 42 and 43, of the shaft 7 and belt chute 29. Pinion gears 44 are illustrated as meshing between shafts 7 and 12, the latter as described, driving sorter belts 18.

Said sorter belts 22 are desirably rotated as by means of chains 45 engaging sprocket wheels 46 of respective shafts.

Effective actuating mechanism between respective sectional sorting belts and associated belt chutes is indicated as comprising worm assemblies 39 disposed at the delivery end of said sorter belts engageably mounted for integral motivity with the belt chutes.

In operation, fruit is carried from a trough, on the progressive face surfaces $5^1$ of belt 5 successively before the operator, who selectively picks and deposits said fruit, by grade, upon the sorter belts 17, 18 and 22, whereby the fruit progresses in directions indicated by arrows H, J and K (Fig. 1) to the bins, as by respective belt chutes.

Fruit which passes the operator without being allocated to the proper sorter belt returns, as by belt surface $17^1$, to again pass over feed belts 5.

The description and representative structural embodiment of the invention is believed clear from the foregoing, and while I have shown and described what is now my preferred form, I do not wish to be understood as confining myself thereto, except as limited by the claims, hereto appended.

What I claim, is,—

1. In fruit sorting apparatus, the combination with a pair of feed belts arranged to have fruit transported thereon, of a plurality of sorting belts comprising a centrally disposed endless belt interposed between said feed belts and having the lower return surface thereof on the same horizontal plane with the upper progressive surface of said feed belts, with means for transferring fruit from said feed belts to said centrally disposed sorter belt, sectional endless belts disposed laterally with respect to the outer edges of said feed belts, and sectional endless belts disposed in offset spaced relation below the edges of the progressive portion of said first named sorter belt, all of said laterally and offset belts having retaining walls disposed longitudinally of their lengths, laterally extending belt chutes from the discharge ends of said sectional sorter belts, rotary bins arranged to receive fruit discharged by said chute belts, a longitudinally disposed belt chute from the discharge end of said first named sorter belt with rotary bins for receiving fruit therefrom and driving means for all of said sorter and chute belts whereby fruit from said feed belts deposited on said sorter belts will be carried by respective chutes to the bins.

2. In apparatus as described in claim 1 wherein flaps are provided for transferring fruit from the feed belts to the return surface of said centrally disposed sorter belt.

3. In fruit sorting apparatus, the combination with a pair of horizontally spaced apart driven feed belts arranged to have fruit transported thereon, of a plurality of sorter belts disposed adjacent thereto in a manner to allow of an operator selecting fruit from said feed belts to be deposited on said sorter belts, said sorter belts comprising an endless belt interposed between said feed belts and having the progressive upper surface in spaced distance above the plane of said feed belts, pairs of sectional belts disposed laterally to the respective outer edges of said feed belts and having the opposing delivery ends thereof in spaced apart relation, and pairs of sectional belts disposed intermediate said first named sorter belt and the feed belts, said sorter belts having means to drive the same to have the directive travel of said first and last named sorter belts outwardly and the directive travel of said second named sorter belts inwardly, chute belts positioned to receive fruit from said sorter belts and bins positioned to receive fruit from said chute belts.

4. An apparatus for sorting fruit comprising a feed belt moving longitudinally, a combined transfer and circulating belt arranged above and laterally of the vertical plane of said feed belt, the top run of said transfer belt moving in the same direction as the top run of said feed belt, and the bottom run of said transfer belt moving in the opposite direction to the top run of the said feed belt and positioned in substantially the same horizontal plane with means for transferring fruit from one to the other of said horizontally aligned runs, a series of transfer belts arranged to convey fruit placed thereon, said belts being positioned in planes between the top run of said transfer and circulating belt and the bottom run of said feed belt with bins located to receive the fruit transferred by said mid-plane belts.

5. An apparatus for sorting fruit comprising feed belts arranged to move in a longitudinal direction and spaced apart, a combined transfer and circulating belt arranged above and between said feed belts, the top run of said transfer and circulating belt moving in the same direction as the top runs of said feed belts and the bottom run of said transfer and circulating belt moving in the opposite direction to said feed belts while being positioned in substantially the same horizontal plane, with means adjacent said aligned runs for circulating fruit from one to the other, a series of transfer belts arranged in parallel relation with said aforementioned belts but moving in different horizontal planes with chute belts moving at right angles to said aforementioned belts to carry fruit placed thereon, and bins located at the ends of said chute belts to receive fruit therefrom.

6. An apparatus for sorting fruit comprising feed belts arranged to move in a longitudinal direction and spaced apart, a combined transfer and circulating belt arranged above and between said feed belts, the top run of said transfer and circulating belt moving in the same direction as the top runs of said feed belts and the bottom run of said transfer and circulating belt running in the opposite direction of said feed belts while being positioned in substantially the same horizontal plane, with means adjacent said aligned runs for circulating fruit from one to the other, a series of sectional belts positioned parallel with said aforementioned belts and operating in tandem relation while moving in opposite directions, another series of sectional belts positioned at substantially right angles to said first mentioned sectional belts to receive fruit from said first sectional belts, with bins at the ends of said angularly placed belts to receive the fruit therefrom.

7. An apparatus for sorting fruit comprising feed belts arranged to move in a longitudinal direction and spaced apart, a combined transfer and circulating belt arranged above and between said feed belts, the top run of said transfer and circulating belt moving in the same direction as the said feed belts while the bottom run of said transfer and circulating belt moves in the opposite direction to the top run of said feed belts while being positioned in substantially the same horizontal plane, with means adjacent said aligned runs for circulating fruit from one to the other, a series of sectional transfer belts arranged to move in parallel relation with said feed and first mentioned transfer belts but positioned in intermediate planes relative to said first mentioned belts, said sectional belts operating in pairs, one sectional pair moving fruit to the opposite ends thereof, while another sectional pair moves fruit to the abutting ends thereof, with other chute belts arranged to receive the fruit from said pairs, and bins arranged to receive the fruit from said chute belts.

8. An apparatus for sorting fruit comprising feed belts and a combined transfer and circulating belt, the feed belts being spaced apart and the transfer and circulating belt being positioned therebetween, a series of sectional transfer belts arranged to move in parallel relation with said feed and circulating belts, said sectional transfer belts being arranged to operate in pairs to receive fruit placed thereon, one sectional pair moving fruit to the outer ends thereof, while another sectional pair moves fruit to the inner abutting ends thereof, additional chute belts arranged adjacent said sectional pairs to receive fruit therefrom, with bins arranged to receive fruit from said chute belts.

9. An apparatus for sorting fruit comprising feed belts and a combined transfer and circulating belt arranged above and between said feed belts, a series of sectional transfer belts located adjacent said feed and transfer belts but arranged in offset planes so that their paths may cross without interference, with bins arranged to receive fruit delivered by said transfer belts.

10. An apparatus for sorting fruit comprising feed belts and a combined transfer and circulating belt arranged above and between said feed belts, a series of pairs of sectional transfer belts located adjacent said feed and circulating belts but arranged in offset planes so that their paths may cross without interference, said sectional pairs moving in opposite directions, with other transfer belts arranged to receive fruit therefrom, and bins arranged to receive fruit from said last mentioned transfer belts.

11. In fruit sorting apparatus the combination with fruit feed belts and a circulating belt therebetween adapted to have fruit transported therealong, a plurality of sorting belts arranged parallel with said feed belts, transversely disposed belts for transporting fruit from said sorter belts, rotary bins for receiving fruit from said transversely disposed belts, said sorter belts comprising endless belts disposed laterally and the progressive portion thereof spaced above said feed belts, sectional belts also disposed at opposite sides of said feed belts and having the progressive upper portions disposed on a horizontal plane with said feed belts, said sectional belts being disposed exteriorly of the progressive portions of said sorter and feed belts.

ROSS MORRIS.